United States Patent [19]
Takahashi et al.

[11] Patent Number: 5,850,676
[45] Date of Patent: Dec. 22, 1998

[54] CLIP WITH ENGAGING MECHANISM

[75] Inventors: Kenji Takahashi, Toyota; Mitsuru Kogami, Utsunomiya; Kazunari Miyasaka, Toyota, all of Japan

[73] Assignee: Nifco Inc., Yokohama, Japan

[21] Appl. No.: 987,234

[22] Filed: Dec. 9, 1997

[30]      Foreign Application Priority Data

Mar. 12, 1997  [JP]  Japan .................................. 9-057778

[51] Int. Cl.⁶ ............................. F16B 13/00; F16B 19/00
[52] U.S. Cl. ................................. 24/297; 24/453; 411/508
[58] Field of Search ........................... 24/297, 289, 453; 411/48, 508, 509, 45

[56]            References Cited

U.S. PATENT DOCUMENTS

| | | | |
|---|---|---|---|
| 4,927,287 | 5/1990 | Ohkawa et al. | 24/297 |
| 4,981,405 | 1/1991 | Kato | 24/297 |
| 5,085,545 | 2/1992 | Takahashi . | |
| 5,211,519 | 5/1993 | Saito | 411/45 |
| 5,301,396 | 4/1994 | Benoit | 24/297 |
| 5,375,954 | 12/1994 | Eguchi . | |

FOREIGN PATENT DOCUMENTS 2 305 961  10/1995  United Kingdom .
2 173 851   4/1996  United Kingdom .

*Primary Examiner*—Victor N. Sakran
*Attorney, Agent, or Firm*—Kanesaka & Takeuchi

[57]            ABSTRACT

A clip of the invention is inserted into holes of two or more panels to connect the panels. The clip is formed of a female member, and a male member. The female member includes a plurality of elastic pieces arranged to form a hollow portion therein, engaging portions disposed in the elastic pieces, and a collar plate disposed at rear ends of the elastic pieces and having a hole communicating with the hollow portion. The male member includes a head to abut against the collar plate, a leg extending from the head to be inserted into the hollow portion to radially outwardly expand the elastic pieces, and lock portions disposed in the leg. The lock portions engage the engaging portions so that the elastic pieces are prevented from being deviated when deviating force is applied thereto.

5 Claims, 6 Drawing Sheets

CLIP WITH ENGAGING MECHANISM

BACKGROUND OF THE INVENTION AND RELATED ART STATEMENT

The present invention relates to a clip with engaging mechanism for connecting two members.

As shown in FIG. 6, in case a panel 60 and a panel 62 are connected in order to facilitate an assembling work, a clip 70 formed of a male member 64 and a female member 66 may be used instead of screws or adhesive.

The female member 66 includes elastic pieces 72, which can elastically expand and contract, and are formed by partly dividing a cylindrical member along an axial direction. When a cylindrical leg 78 forming the male member 64 is pushed into a hollow section defined by the elastic pieces 72, as shown in FIG. 7, the elastic members 72 expand radially and engage a rim of an attachment hole 74 on the panel 62, and the panel 60 and the panel 62 are held between the elastic pieces 72 and a flange part 76 of the female member 66.

However, in case the attachment hole 74 is an elongated hole, depending on a condition of the engagement, one of the three elastic pieces 72 might float in the air or does not engage the rim of the hole, so that only the remaining two elastic pieces 72 may engage the rim of the attachment hole 74.

In this condition, when a removing or pulling force is applied to the clip 70, as shown in FIG. 8, the two elastic pieces 72 engaging the attachment hole 74 are deviated in the directions of arrows A. Accordingly, a holding or engaging margin is reduced, so that the clip 70 is easily disengaged or fallen off.

The present invention has been made in view of the above facts, and an object of the invention is to provide a clip which is not inadvertently fallen off or disengaged from the attachment hole even if the attachment hole is an elongated hole.

Further objects and advantages of the invention will be apparent from the following description of the invention.

SUMMARY OF THE INVENTION

According to a first aspect of the invention, elastic pieces of a female member are inserted into attachment holes formed respectively in a first member and a second member which laminate with each other. When a leg of a male member is inserted from a round hole into a hollow section defined by the elastic pieces, the elastic pieces are pushed and expanded from the inside by the leg. Then, when the leg is pushed until a head of the male member abuts against a collar plate of a female member, outer peripheral surfaces of the radially enlarged elastic pieces engage a rim of the attachment hole, so that the first member and second member are rigidly held between the collar plate and the elastic pieces.

In this condition, engaging portions disposed in the elastic pieces and lock portions disposed in the leg engage with each other to prevent deviation of the elastic pieces. This deviation means that the elastic pieces are deformed toward a direction of closing a slit therebetween(a peripheral direction).

By this structure, even if the attachment hole is the elongated hole and one of the elastic pieces is in a condition of being disengaged or floated in the air according to the engaging condition, other elastic pieces engaging the rim of the elongated hole are not deviated. Thus, even if the removing force is applied to the clip, the engagement is maintained and the clip is not inadvertently fallen off or removed.

According to a second aspect of the invention, the engaging portion is formed of a slit, and the lock portion is formed of a rib. Then, when the leg is pushed until the head of the male member abuts against the collar plate of the female member, the ribs enter from the inside into the slits to engage together to thereby prevent deviation of the elastic pieces.

DETAILED DESCRIPTION OF PREFERRED EMBODIMENTS

Figure 1:
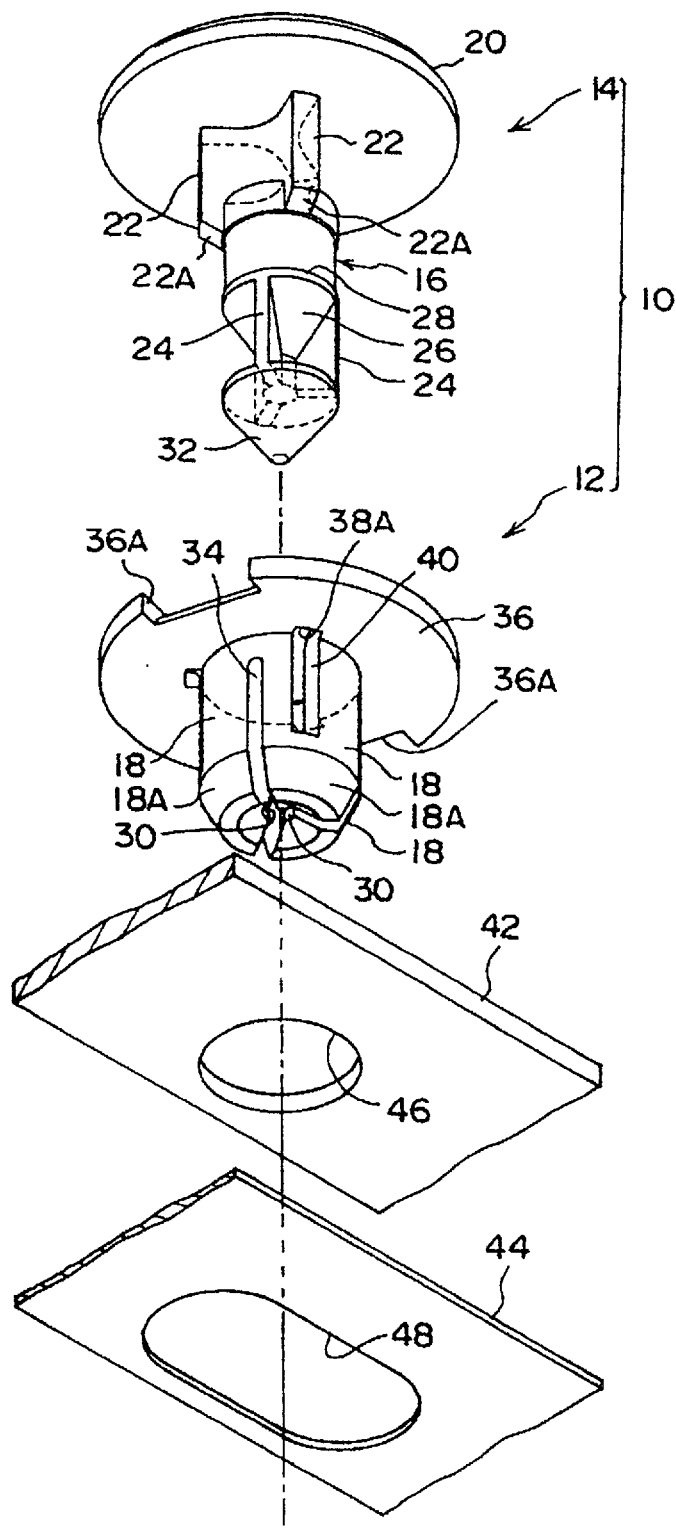
FIG. 1 is an exploded perspective view of a clip according to an embodiment of the invention.
Figure 2:
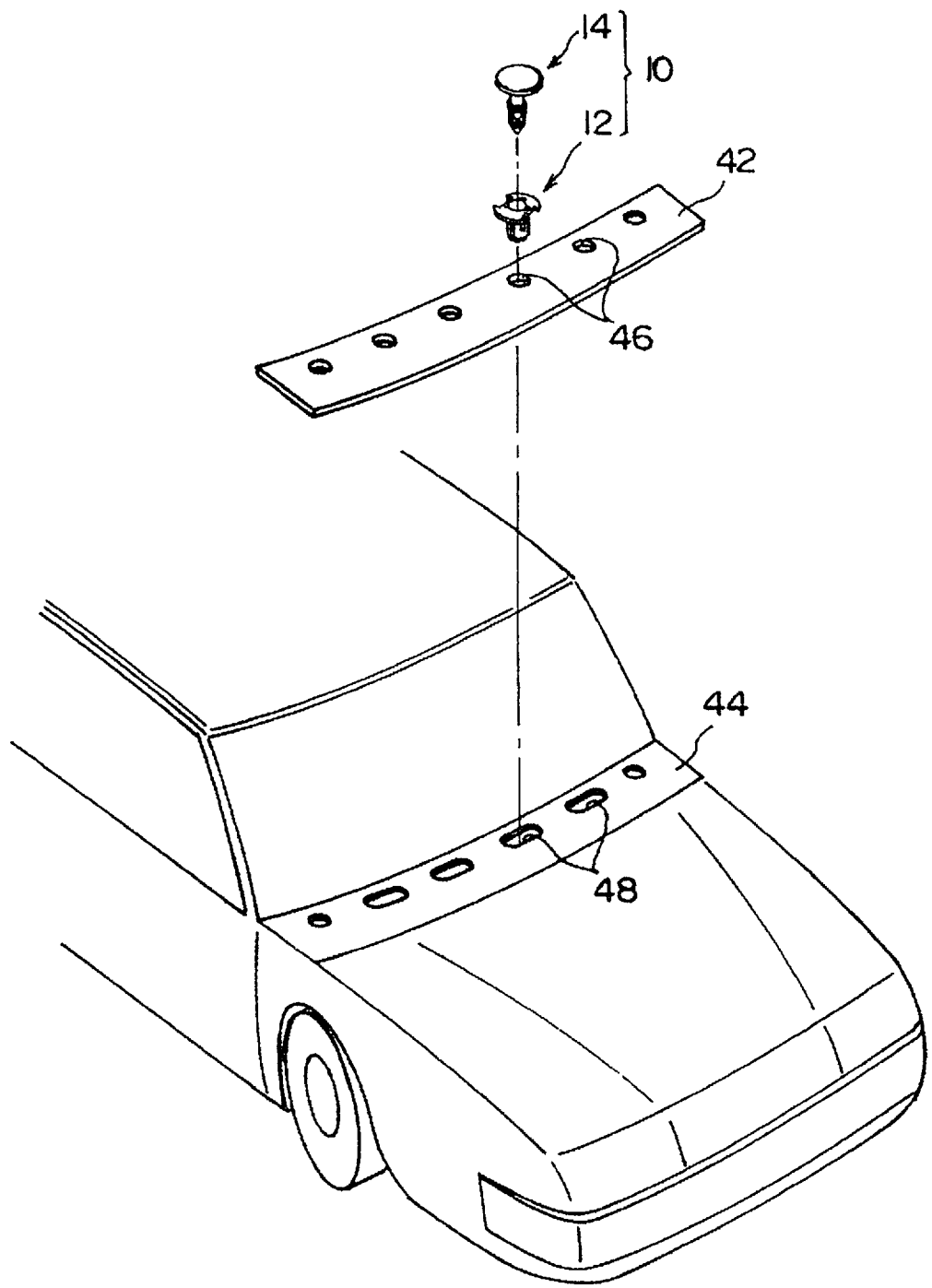
FIG. 2 is an explanatory view showing a state that a cowl louver is being fixed to a cowl panel by the clip according to the embodiment of the invention.

As shown in FIGS. 1 and 2, a clip 10 of an embodiment of the invention is formed of a female member 12 and a male member 14 to be attached to the female member 12.

The male member 14 includes a cylindrical leg 16. An outer diameter of the leg 16 is set to a size such that the leg can pass through a hollow section constituted by elastic pieces 18 of the female member 12, described later.

On the other hand, at a rear end of the leg 16, a head 20 in a disc shape is disposed. From a rear surface of the head 20 to a base of the leg 16, three ribs 22 extend or project in the radial directions with an equal interval, and at the lower end portions of the ribs 22, there are formed guide surfaces 22A which incline toward an axis of the leg 16.

Also, at the lower end portion of the leg 16, outer portions are partly removed with the interval of 120°, so that plate portions 24 projecting radially outwardly from a core portion are formed vertically to be located between the ribs 22. At the head sides of the plate portions 24, there are provided taper portions 26 tapered toward the distal end of the leg 16. Above the taper portions 26, a stopping or engaging wall 28 is disposed along the peripheral direction. The stopping wall 28 is arranged to stop or engage projections 30 formed by projecting the distal ends of the elastic pieces 18 inwardly or reducing the diameter thereof. Also, the distal end portion of the plate portion 24 is provided with an inserting portion 32 in a cone shape with a pointed distal end.

On the other hand, the female member 12 includes three expandable and contractible elastic pieces 18 formed by dividing a cylindrical member by slits 34 along the axial direction. On the outer peripheries of the distal ends of the elastic pieces 18, there are formed inclined surfaces 18A. By the operation of the inclined surfaces 18A, the elastic pieces 18 can be easily inserted into attachment holes 46, 48. Also, the distal end sides of the elastic pieces are thick, and a hollow portion in a mortar shape is formed toward the distal end. Thus, when the inserting portion 32 is inserted, it moves along and contacts with the inner walls of the elastic pieces 18, and is guided to the center of the elastic pieces 18.

Also, at the rear ends of the elastic pieces 18, a collar plate 36 in a circular shape is disposed. In the collar plate 36, there is formed a circular hole 38 communicating with the hollow portion formed by the elastic pieces 18. Furthermore, in the central part of each elastic piece 18, a slit 40 in an elongated shape is formed along the axial direction. An end of the slit 40 reaches the collar plate 36, and a notch 38A is formed at the edge of the circular hole 38.

Next, operation sequences for attaching a cowl louver 44 shown in FIG. 2 to a cowl panel 44 will be explained hereinafter by using the clip 10 of this embodiment.

Figure 3:
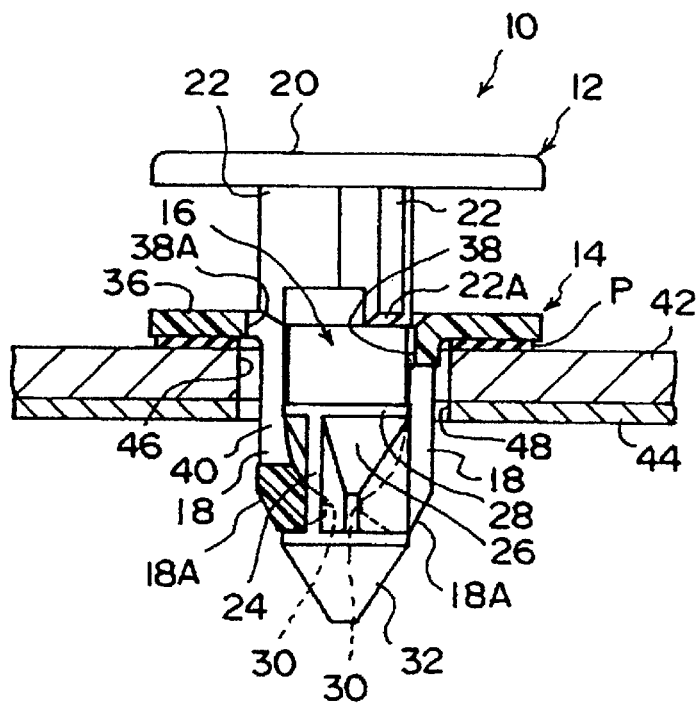
FIG. 3 is a sectional view showing a state that a male member and a female member of the clip of the invention are assembled.

As shown in FIG. 3, firstly, the leg 16 is inserted into the circular hole 38, and pushed until the inserting portion 32 passes between the elastic pieces 18. As a result, the distal ends of the elastic pieces 18 are once expanded by the inserting portion 32, and are dropped between the plate portions 24 to shrink, so that the male member 14 and the female member 12 are assembled. Therefore, there is no possibility that one of the members is lost upon transferring the clip 10.

Here, a circular attachment hole 46 is formed in the cowl louver 42, and an attachment hole 48 formed in the cowl panel 44 is made as an elongated hole in order to absorb deviation of positioning.

Next, the elastic pieces 18 of the female member 12 are inserted into the attachment holes 46, 48 while a packing P is sandwiched between the collar plate 36 and the cowl louver 42, and the male member 14 is pushed until the head 20 of the male member 14 abuts against the collar plate 36. Incidentally, after the elastic pieces 18 of the female member 12 are inserted into the attachment holes 46, 48, the leg 16 of the male member 14 may be inserted into the hole 38.

Figure 4:
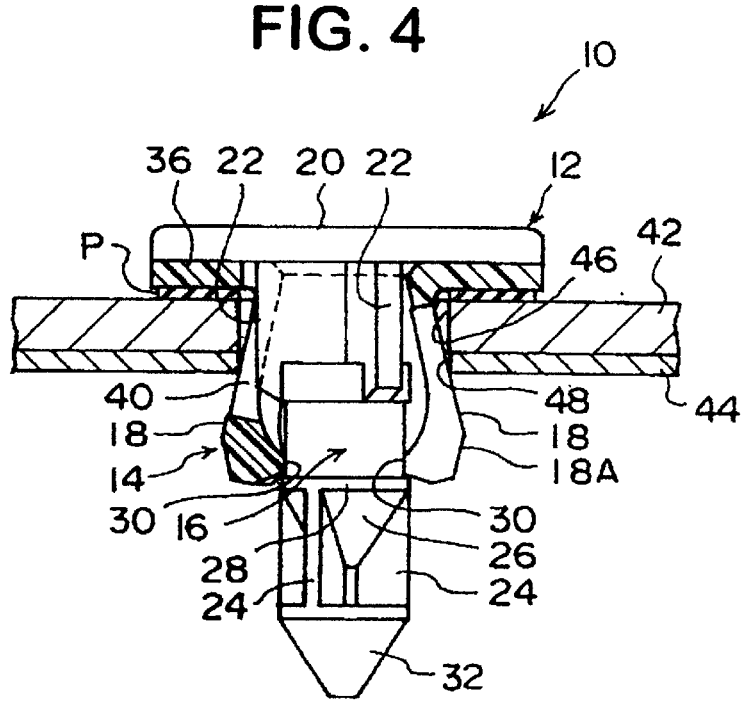
FIG. 4 is a sectional view showing that the cowl louver is fixed to the cowl panel by the clip.

In a course of contacting the head 20 with the collar plate 36, the taper portions 26 slidably move along the projections 30 disposed at the distal ends of the elastic pieces 18 to gradually expand the elastic pieces 18. Then, when the head 20 abuts against the collar plate 36, as shown in FIG. 4, the outer peripheral surfaces of the expanded elastic pieces 18 engage the edge of the attachment hole 48, so that the cowl panel 44 and the cowl louver 42 are held between the collar plate 36 and the elastic pieces 18.

At this time, the slits 40 formed in the elastic pieces 18 engage the ribs 22 disposed at the leg 16 to thereby prevent the deviation of the elastic pieces 18. This deviation means that the elastic pieces 18 are deformed toward the direction narrowing the slit 34 (peripheral direction).

Figure 5:
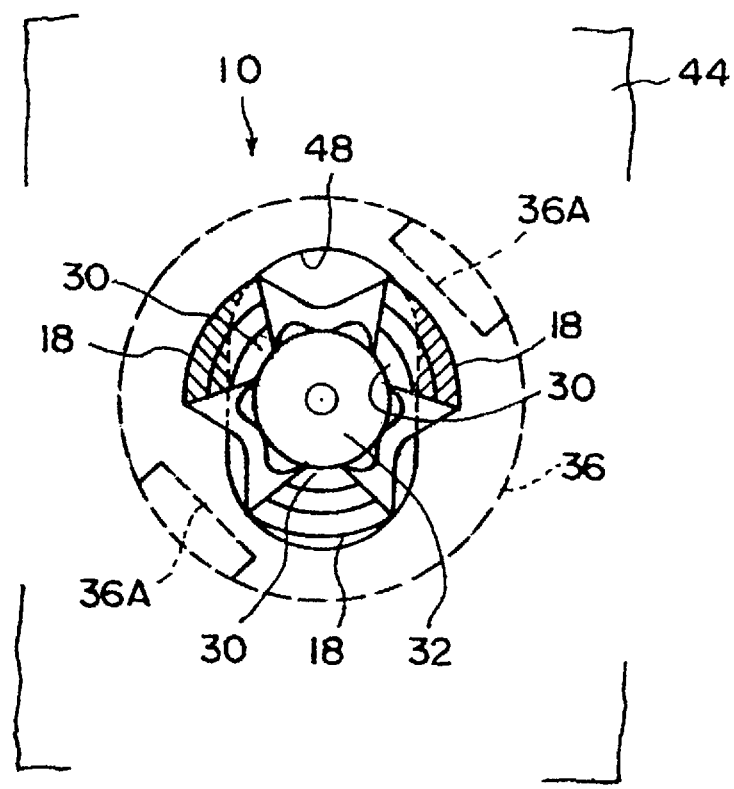
FIG. 5 is a bottom plan view for showing an attached condition of the clip, as seen from the cowl panel side.
Figure 6:
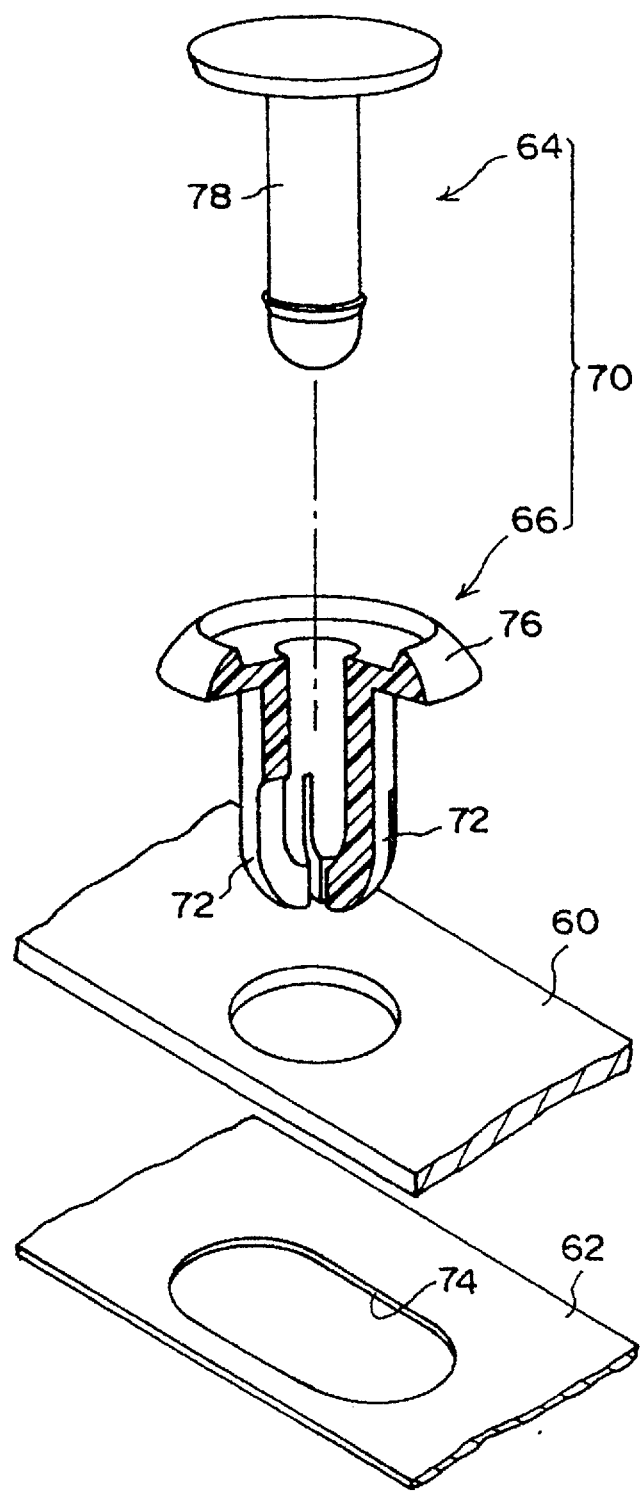
FIG. 6 is an exploded perspective view of a conventional clip.
Figure 7:
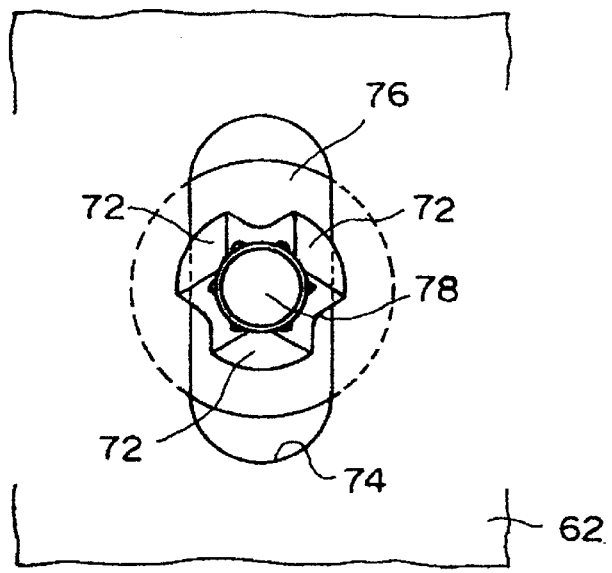
FIG. 7 is a bottom plan view for showing an attached condition of the conventional clip, as seen from a lower side of the panel.
Figure 8:
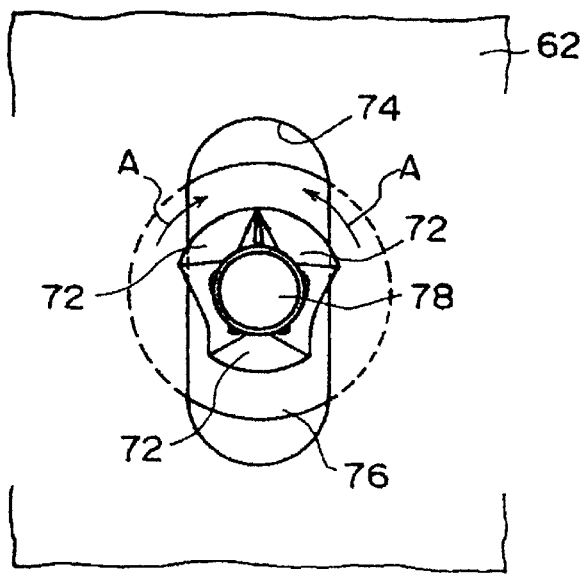
FIG. 8 is a bottom plan view for showing a condition when the removing force is applied to the conventional clip, as seen from the lower side of the panel.

Therefore, as shown in FIG. 5, in the condition that one of the elastic pieces 18 (lower side) is floated in the air or does not engage the edge of the hole, even if the removing force is applied to the clip 10, two elastic pieces 18 engaging the edges of the attachment hole 48 are not deviated. Thus, the holding or engaging margins (portions shown by oblique lines in the figure) are maintained, and the clip is not inadvertently fallen off or disengaged.

Also, the rib 22 is located between the plate portions 24, and the slit 40 is located at a central part of the elastic piece 18, respectively. Namely, when the leg 16 is pushed into the hole 38, the plate portions 24 are automatically guided by the slits 34 located between the elastic pieces 18, so that the ribs 22 and the slits 40 are positioned on the same lines, respectively. Thus, by simply pushing the male member 14 into the female member 12 without considering the position of the ribs 22, the ribs 22 are engaged with the slits 40.

Furthermore, since the guide surfaces 22A are formed on the ribs 22, the ribs 22 are smoothly guided into the slits 40 through the notches 38A.

Incidentally, in the present embodiment, there has been explained a case with the three elastic pieces 18. However, it is needless to say that the elastic pieces can be more than three pieces, and also, instead of the slits 40, elongated grooves extending in the axial direction can be provided. Conversely, elongated grooves may be formed in the leg 16, and the ribs 22 may be formed on the rear surfaces of the elastic pieces 18 so as to engage the elongated grooves. However, it is preferable that the ribs 22 are disposed in the leg 16 since allowable shearing stress of the male member 14 becomes greater in this case.

Further, when the clip 10 of the present embodiment is pulled out, a thin plate is inserted into a recess 36A notched at the outer rim of the collar plate 36 and the head 20 is lifted. Thus, the distal ends of the elastic pieces 18 are dropped between the plate portions 24, and the elastic pieces 18 radially shrink. In this condition, the female member 12 and the male member 14 may be pulled out together.

Since the present invention is structured as described above, there is no possibility that the elastic pieces are deviated. Thus, even if the attachment hole is an elongated hole, the clip is not dropped off, and the condition of connecting the panels can be maintained.

While the invention has been explained with reference to the specific embodiments of the invention, the explanation is illustrative and the invention is limited only by the appended claims.

What is claimed is:

1. A clip comprising:

a female member including a plurality of elastic pieces arranged to form a hollow portion therein, said elastic pieces elastically deformable in radial directions and being formed of a cylindrical member, and a plurality of first slits formed in the cylindrical member and extending along an axial direction thereof from a front end of the cylindrical member to partially divide the same to thereby define the elastic pieces; engaging portions disposed in the elastic pieces, each of the engaging portions being formed of a second slit formed in each of the elastic pieces extending along the axial direction; and a collar plate disposed at rear ends of the elastic pieces, said collar plate having a hole communicating with the hollow portion defined by the elastic pieces, and a male member including a head to abut against the collar plate; a leg extending from the head to be inserted into the hollow portion to expand the elastic pieces; and lock portions disposed in the leg, each of said lock portions being formed of a rib projecting radially outwardly from the leg and extending along an axial direction of the leg to engage the second slit so that the elastic pieces are prevented from being deviated when a deviating force is applied thereto.

2. A clip according to claim 1, wherein said each second slit is formed in a middle area of said each elastic piece.

3. A clip according to claim 1, wherein said leg includes a plurality of plate portions near a front end of the leg away from the head, said plate portions extending along an axial direction of the leg to be disposed in and engage the first slits.

4. A clip according to claim 3, wherein said leg further includes depressions, each depression being disposed between the plate portions, and tapered portions extending from the depressions toward the head, each of the elastic pieces having an inward projection at a front end, said inward projection being disposed in the depression when the male and female members are temporally assembled together.

5. A clip according to claim 4, wherein said leg further includes a stopping wall adjacent the tapered portions, and a cylindrical section situated between the stopping wall and the lock portions so that when the head abuts against the collar portion, said inward projections are located on the cylindrical section and engage the stopping wall.

\* \* \* \* \*